United States Patent
Gu (10) Patent No.: US 7,206,016 B2
(45) Date of Patent: Apr. 17, 2007

(54) FILTERING ARTIFACTS FROM MULTI-THREADED VIDEO

(75) Inventor: Qunshan Gu, Londonderry, NH (US)

(73) Assignee: Polycom, Inc., Pleasanton, CA (US)

( * ) Notice: Subject to any disclaimer, the term of this patent is extended or adjusted under 35 U.S.C. 154(b) by 1421 days.

(21) Appl. No.: 09/846,508

(22) Filed: May 1, 2001

(65) Prior Publication Data
US 2002/0036707 A1    Mar. 28, 2002

Related U.S. Application Data

(60) Provisional application No. 60/200,943, filed on May 1, 2000.

(51) Int. Cl.
H04N 7/14      (2006.01)
(52) U.S. Cl. .............................. 348/14.13; 348/14.12; 348/14.08
(58) Field of Classification Search .. 348/14.01–14.08, 348/14.12, 14.13, 407.1, 409.1, 416.1, 415.1; 375/240.01, 240.15, 240.16, 240.27, 240.28, 375/240.29
See application file for complete search history.

(56) References Cited

U.S. PATENT DOCUMENTS 5,920,356 A  *  7/1999  Gupta et al. ................. 348/606
5,969,766 A  *  10/1999  Kim ....................... 375/240.14
6,744,924 B1 *  6/2004  Hannuksela et al. ........ 382/232
6,807,231 B1 *  10/2004  Wiegand et al. ....... 375/240.12

* cited by examiner

Primary Examiner—Melur Ramakrishnaiah
(74) Attorney, Agent, or Firm—Wong, Cabello, Lutsch, Rutherford & Brucculeri, LLP (57) ABSTRACT

There is provided herein a system for reducing artifacts associated with multi-threaded video coding. The system generates a virtual thread from the multi-threaded data. The virtual thread combines the multi-thread data with estimates of virtual thread data in a manner that variably weights the combination according to motion information decoded from the multi-thread. A post-processing system is described that generates a single, virtual thread of video data, based upon image and motion data from a plurality of different threads in a multi-threaded video stream. The system estimates motion vectors for the virtual thread, generates frames of estimated video data, and applies the estimated frames to a filter. The filter generates an output that combines each new estimated frame with the current reference frame on a pixel-by-pixel basis. Pixel values generated by the filter are weighted between the values of the estimated frame and the current reference frame in a manner that brings an error function for the pixels below a threshold that may vary according to a degree of motion present in the plurality of different threads.

16 Claims, 4 Drawing Sheets

FILTERING ARTIFACTS FROM MULTI-THREADED VIDEO

RELATED APPLICATIONS

This application is based upon, claims the benefit of, and incorporates by reference U.S. Prov. App. No. 60/200,943, filed on May 1, 2000, and entitled "Filtering Artifacts Associated with Multi-Threaded Coded Video Transmissions."

BACKGROUND OF THE INVENTION

Moving video may be encoded in a number of threads, with each thread containing coded video from different frames of video data. The threads are recombined at a receiving terminal as a single video stream. Video encoded in this manner is more error resilient, and may, for example, transmit at a reduced frame rate when errors occur in one of the threads. An exemplary multi-threaded video coding/decoding system is described in U.S. patent application Ser. No. 09/389,170, entitled "An Error Recovery Method for Video Compression Coding using Multiple Reference Buffers and a Message Channel," the teachings of which are incorporated herein by reference.

As a significant disadvantage, multi-threaded video may exhibit visual artifacts. For example, different threads are not typically referenced to each other, and as a result, regions of an image, such as the image background, may drift so that the background for one thread is offset from the background for another thread. Even slight offsets of this type may cause visually noticeable jitter in a recombined video stream. There remains a need for a video coding scheme that reduces visual artifacts associated with multi-threaded video.

SUMMARY OF THE INVENTION

There is provided herein a system for reducing artifacts associated with multi-threaded video coding. The system generates a virtual thread from the multi-threaded data. The virtual thread combines the multi-thread data with estimates of virtual thread data in a manner that variably weights the combination according to motion information decoded from the multi-thread. A post-processing system is described that generates a single, virtual thread of video data, based upon image and motion data from a plurality of different threads in a multi-threaded video stream. The system estimates motion vectors for the virtual thread, generates frames of estimated video data, and applies the estimated frames to a filter. The filter generates an output that combines each new estimated frame with the current reference frame on a pixel-by-pixel basis. Pixel values generated by the filter are weighted between the values of the estimated frame and the current reference frame in a manner that brings an error function for the pixels below a threshold that may vary according to a degree of motion present in the plurality of different threads.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including a technique for filtering artifacts from a dual-threaded, H.263-compliant video stream. However, it will be understood by those of ordinary skill in the art that the methods and systems described herein may be suitably adapted to other multi-threaded video, including video with three or more threads, and video that is encoded using other video standards or protocols. All such adaptations and modifications that would be clear to one of ordinary skill in the art are intended to fall within the scope of the invention described herein.

Figure 1:
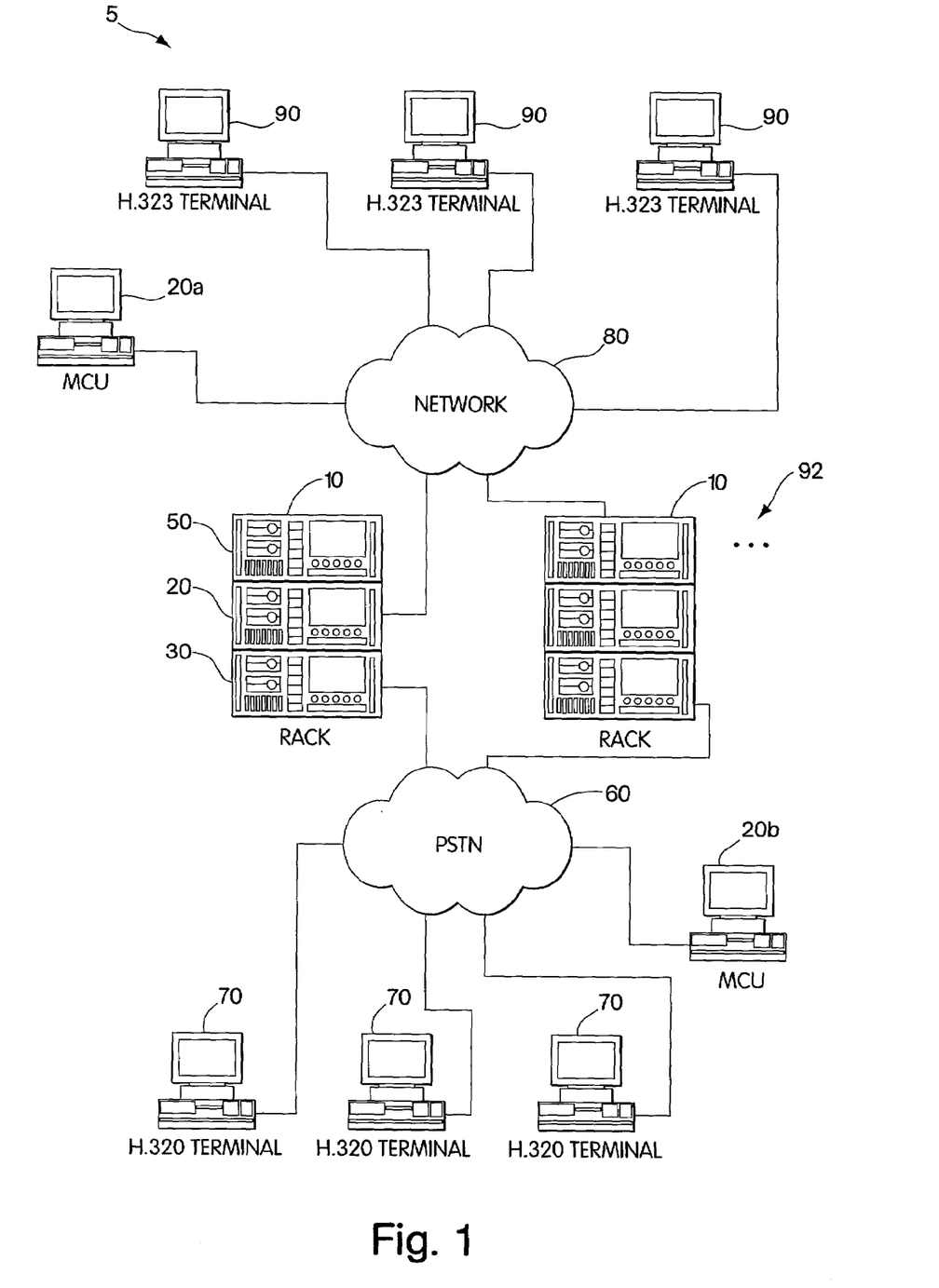
FIG. 1 shows a video conferencing system that may be used with the invention.

FIG. 1 shows a video conferencing system that may be used with the invention. In a video conferencing network 5, a rack 10 may include a multi-point conference unit ("MCU") 20, a gateway 30, and hardware/software for other services. The gateway 30 may provide one or more connections to the Public Switched Telephone Network 60, for example, through high speed connections such as Integrated Services Digital Network ("ISDN") lines, T1 lines, or Digital Subscriber Lines ("DSL"). A plurality of PSTN video conferencing ("VC") terminals 70 may also be connected in a communicating relationship with the PSTN 60, and may be accessible using known telecommunications dialing and signaling services. The MCU 20 may be connected in a communicating relationship with the Internet 80. A plurality of Internet Protocol ("IP") VC terminals 90 may also be connected in a communicating relationship with the Internet 80, and may be accessible using known data networking techniques, such as IP addressing.

It will be appreciated that, although the following description refers to an IP network 80 and the PSTN 60, any network for connecting terminals may be usefully employed as a video conferencing network according to the principles of the invention. The IP network 80, for example, may be any packet-switched network, a circuit-switched network (such as an Asynchronous Transfer Mode ("ATM") network), or any other network for carrying data, and the PSTN 60 may be any circuit-switched network, or any other network for carrying circuit-switched signals or other data. It will additionally be appreciated that the PSTN 60 and/or the IP network 80 may include wireless portions, or may be completely wireless networks. It will also be appreciated that the principles of the invention may be usefully employed in any multimedia system.

It will be appreciated that the components of the rack 10, such as the MCU 20, the gateway 30, and the other services 50, may be realized as separate physical machines, as separate logical machines on a single physical device, or as separate processes on a single logical machine, or some combination of these. Additionally, each component of the rack 10, such as the gateway 30, may comprise a number of separate physical machines grouped as a single logical machine, as for example, where traffic through the gateway 30 exceeds the data handling and processing power of a single machine. A distributed video conferencing network may include a number of racks 10, as indicated by an ellipsis 92.

Each PSTN VC terminal 70 may use an established telecommunications video conferencing standard such as H.320. H.320 is the International Telecommunication Union telecommunications ("ITU-T") standard for sending voice and audio over the PSTN 60, and provides common formats for compatible audio/video inputs and outputs, and protocols that allow a multimedia terminal to utilize the communications links and synchronize audio and video signals. The T.120 standard may also be used to enable data sharing and collaboration. Each PSTN VC terminal 70 may include inputs such as a microphone, video camera, and keyboard, and may include outputs to display video content such as a monitor and a speaker. As used herein, the term "display" is intended to refer to any rendering of media, including audio, still video, moving video, and so forth, through speakers, headphones, monitors, projectors, or other rendering devices, unless another meaning is indicated. The H.320 and T.120 standards may be implemented entirely in software on a computer, or in dedicated hardware, or in some combination of these.

Each PSTN VC terminal 70 may include coder/decoders ("codecs") for different media. Video codecs may include codecs for standards such as H.261 FCIF, H.263 QCIF, H.263 FCIF, H.261 QCIF, and H.263 SQCIF. These are well known teleconferencing video standards that define different image size and quality parameters. Audio codecs may include codecs for standards such as G.711, G.722, G.722.1, and G.723.1. These are well known teleconferencing audio standards that define audio data parameters for audio transmission. Any other proprietary or non-proprietary standards currently known, or that may be developed in the future, for audio, video, and data may likewise be used with the invention, and are intended to be encompassed by this description. For example, current H.320 devices typically employ monaural sound, however, the principles of the invention may be readily adapted to a conferencing system employing stereo coding and reproduction, or any other spatial sound representation.

The gateway 30 may communicate with the PSTN 60, and may translate data and other media between a form that is compatible with the PSTN 60 and a form that is compatible with the Internet 80, including any protocol and media translations required to transport media between the networks.

Each IP VC terminal 90 may use an established data networking video conferencing standard such as H.323. H.323 is the ITU-T standard for sending voice and audio over data networks using IP, and provides common formats for compatible audio/video inputs and outputs, and protocols that allow a multimedia terminal to utilize the communications links and synchronize audio and video signals. The T.120 standard may also be used to enable data sharing and collaboration. Each IP VC terminal 90 may include inputs such as a microphone, video camera, and keyboard, and may include outputs to display video conferencing content such as a monitor and a speaker. The H.323 and T.120 standards may be implemented entirely in software on a computer, or in dedicated hardware, or in some combination of these. Each IP VC terminal 90 typically also includes standard audio and video codecs, such as those described for the PSTN VC terminas 70.

The MCU 20 may communicate with the IP VC terminals 90 over the Internet 80, or with the PSTN VC terminals 70 over the PSTN 60. The MCU 20 may include hardware and/or software implementing the H.323 standard (or the H.320 standard, where the MCU 20 is connected to the PSTN 60) and the T.120 standard, and also includes multipoint control for switching and multiplexing video, audio, and data streams in a multimedia conference. The MCU 20 may additionally include hardware and/or software to receive from, and transmit to, PSTN VC terminals 70 connected to the gateway 30. As shown in FIG. 1, an MCU 20 may reside on one of the racks 10, or may be located elsewhere in the network, such as MCU's 20a and 20b. It will be appreciated that an MCU 20 may also reside on one of the PSTN VC terminals 70, or one of the IP VC terminals 90, and may be implemented in hardware, software, or some combination of these.

The rack 10 may provide additional services for use in a video conferencing network. These may include, for example, audio/video coder/decoders ("codecs") that are not within the H.323 or H.320 standards, such as the G2 encoder and streamer for use with a proprietary streaming system sold by RealNetworks, Inc., and a Windows Media codec for use with proprietary media systems sold by Microsoft Corporation. Other services may include, for example, a directory server, a conference scheduler, a database server, an authentication server, and a billing/metering system.

Figure 2:
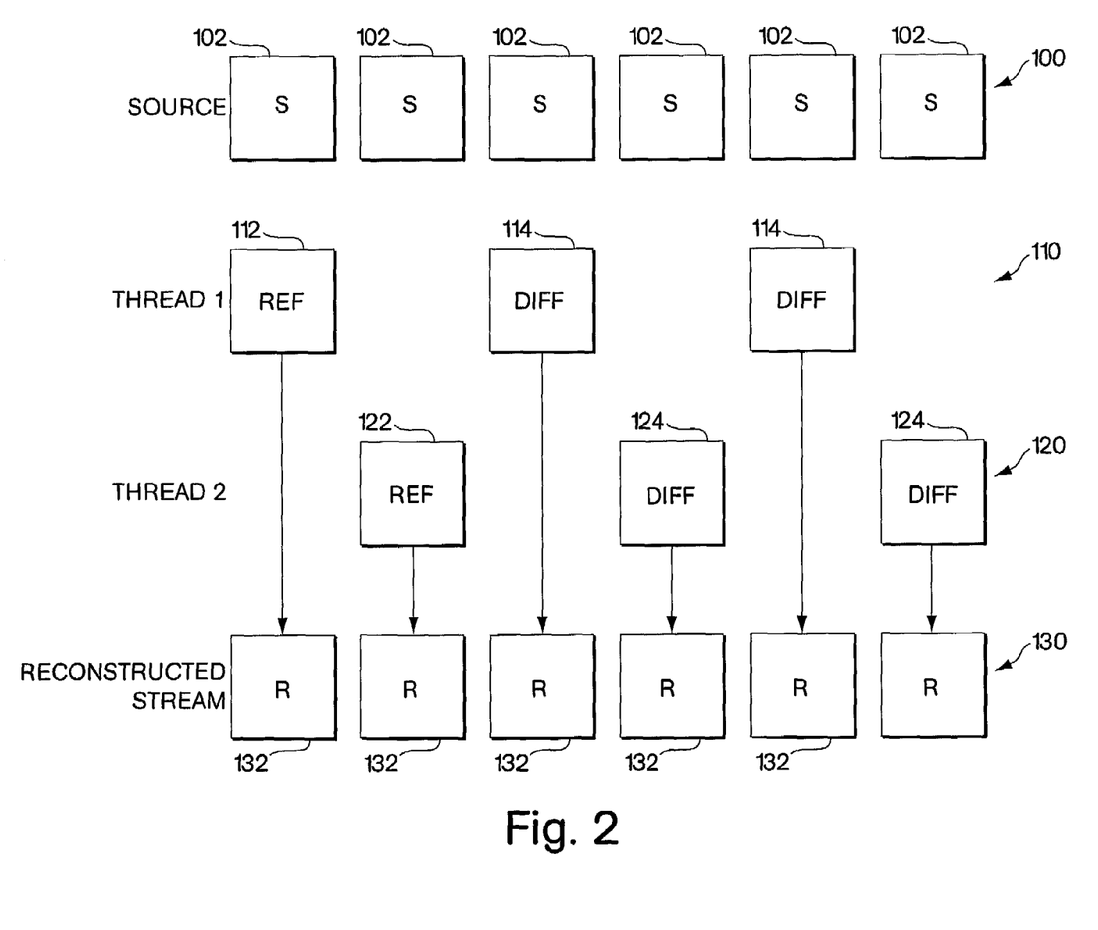
FIG. 2 depicts an example of multi-threaded video data that may be used in the system of FIG. 1.

FIG. 2 depicts an example of multi-threaded video data that may be used in the system of FIG. 1. A source 100 of video data may provide a plurality of sequential frames 102 of video data. A first thread 110 may include a reference image 112 and a plurality of differential images 114. A second thread 120 may include a reference image 122 and a plurality of differential images 124. A reconstructed stream 130 of frames 132 may be formed from the first thread 110 and the second thread 120, and may be displayed on a display device. As used herein, the term frame is intended to refer to video data for a point in time. It will be appreciated that a frame may be stored, encoded, or transmitted in a variety of forms. For example, a frame may be encoded as a plurality of blocks of video data, each block having fixed pixel dimensions that may be grouped with other blocks to complete an image at a point in time. A frame may include all pixel data for an image (a "reference frame"), or a frame may include differential data describing changes in video data (a "differential frame") from an earlier reference frame. A frame may include luminance data, chrominance data, grayscale data, or any other form of data used to store images, included transformed data.

The source 100 may generally provide digitized image data represented as pixels for display. Each sequential frame 102 may correspond to a different time, so that the source 100 is captured at a frame rate, such as sixty frames per second. As depicted in FIG. 2, the frame 102 at the left is the earliest frame, followed temporally by adjacent frames, with the frame 102 at the right being the latest frame in time. In the two-thread example of FIG. 2, the first thread 110 contains data for alternate frames 102 from the source 100. The first frame 102 from the source 100 may be encoded as the reference frame 112, and subsequent differential frames 114 may be encoded based upon differences between the reference frame 112 and corresponding frames 102 from the source. For example, the first differential frame 114 of the first thread 110 is encoded based upon the reference frame 112, and the third frame 102 from the source 100. The second thread 120 contains data for alternate frames 102 from the source 100. The second frame 102 from the source 100 may be encoded as the reference frame 122, and subsequent differential frames 124 may be encoded based upon differences between the reference frame 122 and corresponding frames 102 from the source. For example, the first differential frame 124 of the second thread 120 is encoded based upon the reference frame 122, and the fourth frame 102 from the source 100. The reconstructed stream 130, composed of frames for the first thread 110 and the second thread 120, corresponds to frames 102 of the source 100, and may be stored for post-processing. Multi-threaded and differential encoding may be performed using well-known protocols and standards, such as those set forth in H.263 (including different versions of the H.263 standard).

Figure 3:
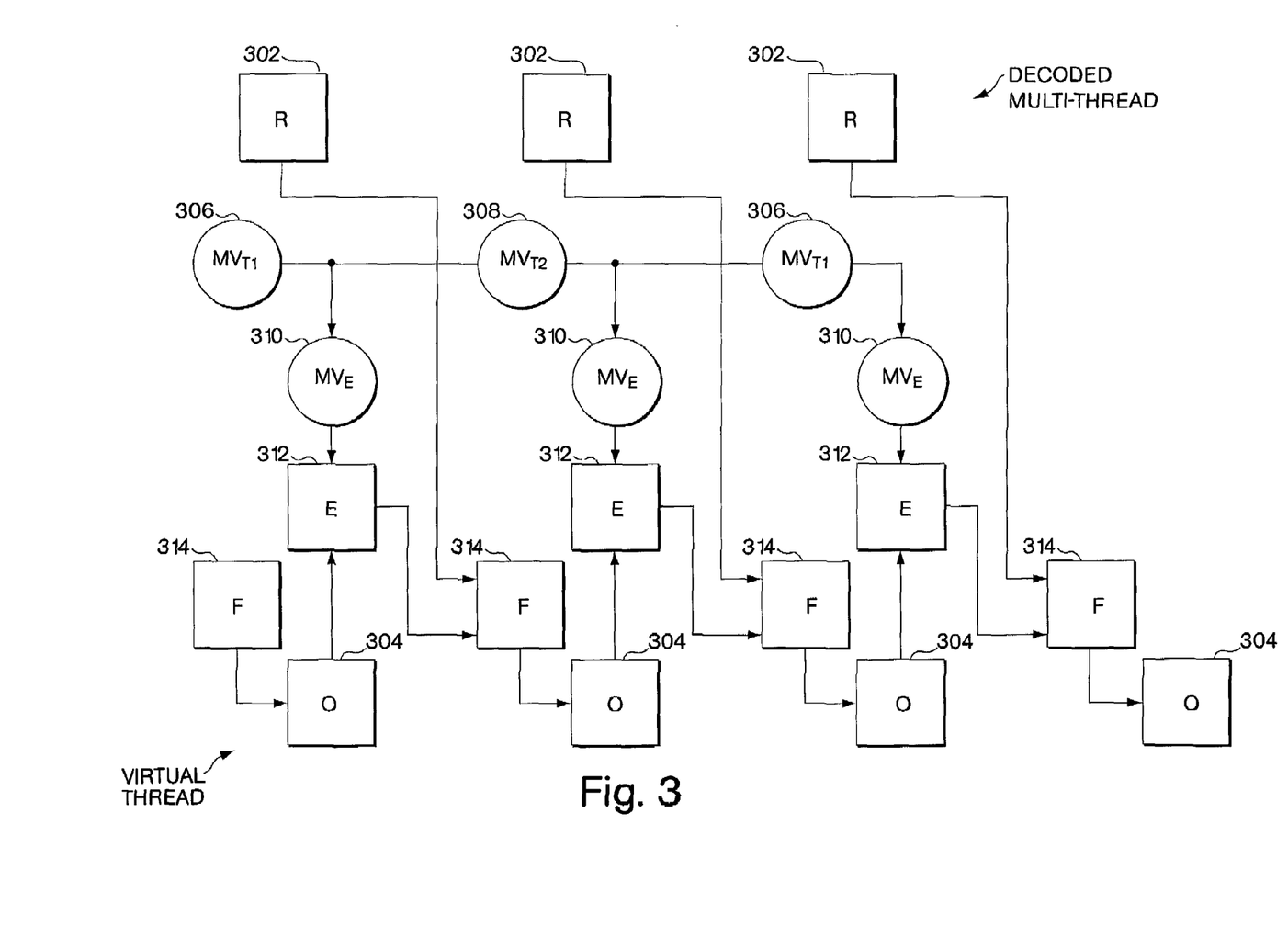
FIG. 3 depicts processing of multi-threaded video data.

FIG. 3 depicts processing of multi-threaded video data. As shown in FIG. 3, frames 302 from a reconstructed stream of decoded, multi-threaded data may be further processed to generate output frames 304 of a virtual thread for display. The frames 302 may be the reconstructed stream 130 of FIG. 2, and may include frames from a number of threads of video data. Motion vectors 306 from the first thread and motion vectors 308 from the second thread may be used to generate output frames 304 using, for example, linear extrapolation of x and y components of the motion vectors 306, 308 to obtain estimated motion vectors 310. These estimated motion vectors 310 may be applied to output frames 304 of the virtual thread to obtain estimated frames 312. One of the estimated frames 312 and one of the frames 302 from the reconstructed stream may be applied to a filter 314 to obtain a subsequent output frame 304 of the virtual thread. Post-processing will now be described in more detail.

Estimated motion vectors 310 may be determined using motion vectors for temporally adjacent frames of the virtual thread. For example, a recent motion vector 306, 308 and a recent output frame 304 may be used to generate an estimated frame 312. The estimated frame 312 may be temporally offset from the frame 302 of the reconstructed stream, to which the motion vectors 306, 308 correspond. In this case, the estimated motion vector 310 should be adjusted for the time change using, for example, the following formula:

$$MV_e = \{MV_{e,x}, MV_{e,y}\} = \left\{MV_x \cdot \left[\frac{T_\delta - T_1}{T_2 - T_1}\right], MV_y \cdot \left[\frac{T_\delta - T_1}{T_2 - T_1}\right]\right\} \quad [\text{Eq. 1}]$$

where:
$MV_e$=estimated motion vector, having x and y components;
$MV_x$=x-motion vector for thread;
$MV_y$=y-motion vector for thread;
$T_1$=time of reference frame for motion vector;
$T_2$=time of frame for motion vector, $MV_x, MV_y$; and
$T_\delta$=time of an estimated frame that is offset from time base for $T_1$ & $T_2$ As another example, an estimated frame 312 may be interpolated, based upon an average of motion vectors 306, 308 from different, temporally adjacent threads, with suitable adjustments to the time base. This approach is indicated generally in FIG. 3 as a connection between a motion vector 306 from a first thread and a motion vector 308 from a second thread to each estimated motion vector 310. It will, however, be appreciated from the description herein that estimated motion vectors may be obtained from a single thread, or from two or more different threads. For example, in the following formula, motion vectors are determined for a virtual thread that is at a time-wise midpoint between a first thread and a second thread:

$$MV_e = \left\{\left[\frac{MV_{T1,x} + MV_{T2,x}}{2}\right] \cdot \Delta T, \left[\frac{MV_{T1,y} + MV_{T2,y}}{2}\right] \cdot \Delta T\right\} \quad [\text{Eq. 2}]$$

where:
$MV_e$=estimated motion vector, having x and y components;
$MV_{T1}$=motion vector for thread 1;
$MV_{T2}$=motion vector for thread 2; and
$\Delta T$=scaling for change in time base.

The above is a linear interpolation for a two-threaded video stream. As will be clear to those of ordinary skill in the art, other approaches may be used to estimate motion vectors, and adaptations may be required where three or more threads are present. The estimated motion vector, $MV_e$, may be used to obtain an estimated frame 312 of video data by applying known techniques to an estimated motion vector 310 and an output frame 304 of the virtual thread.

The estimated frame 312 and one of the frames 302 of the reconstructed stream may be applied to a filter 314, which operates on a pixel-by-pixel basis to generate a next output frame 304 of the virtual thread. The filter 314 may be, for example, a time domain filter described by the following equation, which may be applied to each pixel of a frame:

$$y[n_1] = \alpha \cdot x[n_2] + (1-\alpha) e[n_3] \quad [\text{Eq. 3}]$$

where:
$y[n_1]$=output of the filter;
$x[n_2]$=pixel value from decoded multi-thread;
$e[n_3]$=estimated pixel value; and
$\alpha$=weighting factor.

As shown above, the filter 314 may weight a value for each pixel of the estimated frame 312 and the frame 302 of the reconstructed stream according to a weighting factor, $\alpha$, which may have a value between 0 and 1. As shown more specifically in Eq. 3, the value from the estimated frame 304 is weighted by a factor of $\alpha$, and the reconstructed frame 302 is correspondingly weighted by a factor of $(1-\alpha)$. As such, relatively high values of $\alpha$ will generate a filter output that is more like the decoded multi-thread data than the estimated thread data, and vice versa. The weighting factor, $\alpha$, may have predetermined values, such as 0, ⅛, ⅔, ..., ⅞, 1, or the weighting factor may be continuously defined over the range from 0 to 1.

It may be noted that time bases for the sequential data in Eq. 3 is indicated with three separate subscripts, $n_1$, $n_2$, and $n_3$. This notation indicates that there will generally be a one-to-one correspondence between the sequences, in the sense that, for example, if the filter output comprises sixty frames (or pixel values for a pixel) per second, then decoded multi-thread and the estimated pixel values will also be available at sixty discrete values per second. However, as noted above with respect to the calculation of estimated motion vectors, the sequences may be temporally offset, provided suitable adjustments are made.

Output frames 304 that have been generated as described above may be provided for display on any suitable display device. Further post-processing steps prior to display may include sizing the output frames 304 for a particular display, and coding the video for use by a particular device.

Figure 4:
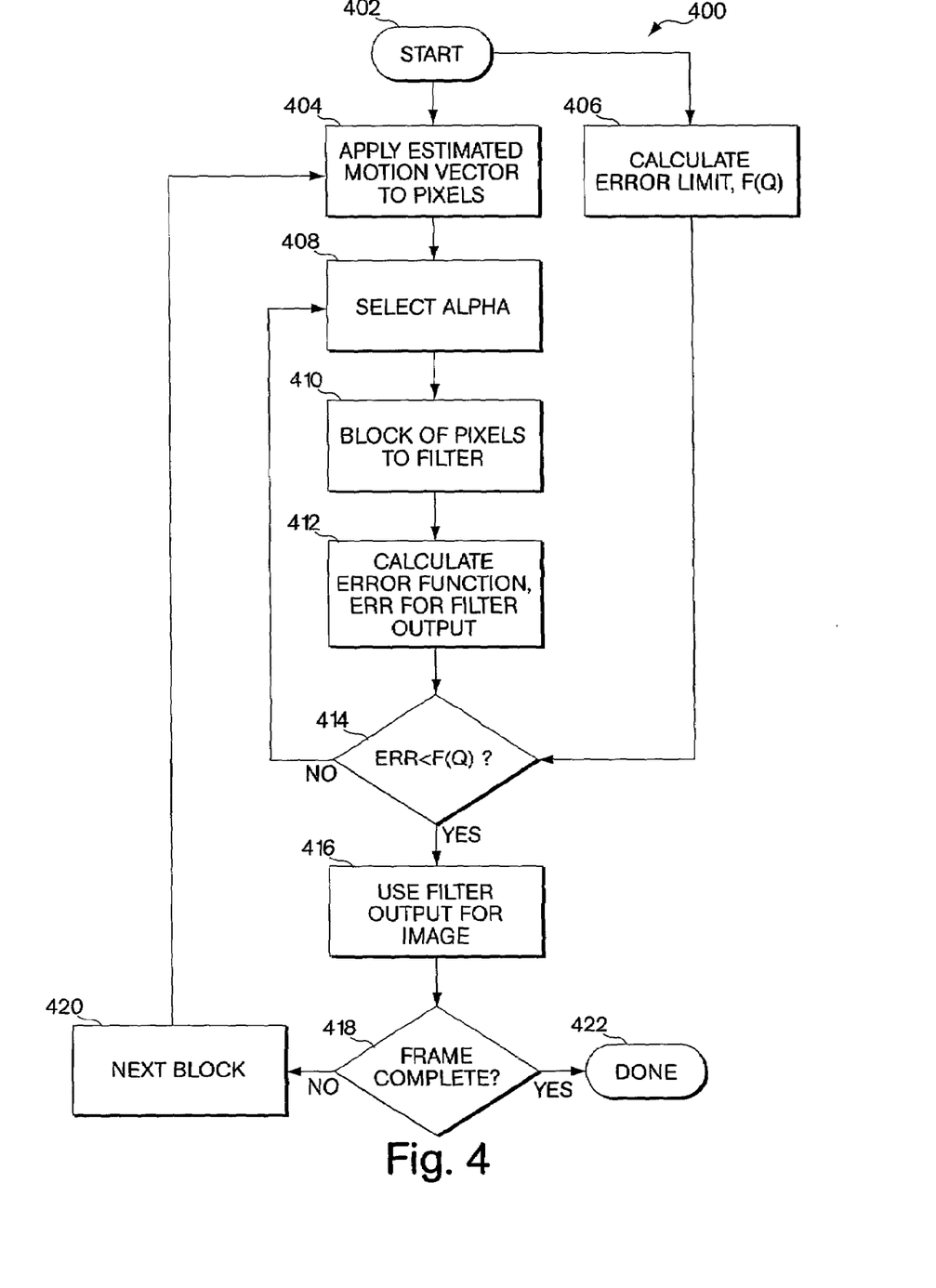
FIG. 4 is a flow chart showing post-processing of a frame of video data.

FIG. 4 is a flow chart showing post-processing of a frame of video data. The process 400 may start 402 by applying estimated motion vectors to pixels of a block of data, as shown in step 404. In this step a block of possible data for a virtual thread is generated. An error limit may also be calculated for subsequent use, as shown in step 406. The error limit may vary from frame to frame, or (although not depicted in FIG. 4) from block to block within a frame, or from pixel to pixel within a block. The error limit may be smaller when, for example, there is relatively little motion within a block of pixels and the quantization value for the block is correspondingly small. Thus the error limit may operate generally to ensure that small changes, such as those that contribute to image jitter, are filtered while large changes, such as those that are due to motion, are not filtered. The error limit may be determined using a formula that is a function of the block size, the quantization value, and a tuning parameter:

$$f(Q) = A \cdot B \cdot Q \qquad [\text{Eq. 4}]$$

where

Q=a quantization value decoded from the video stream;
A=a tuning parameter; and
B=a block size (number of pixels).

The tuning parameter may be empirically established based upon visibility of artifacts in a processed video stream, or automatically calculated by examination of variations between the processed video stream and unprocessed threads of video data. The tuning parameter generally provides control over a sensitivity of the filter to temporal changes in data. Adaptations may be made to adapt the error limit to other video standards. For example, in a Moving Picture Experts Group ("MPEG") video stream, which employs a matrix of quantization coefficients, Q may be determined as an average of values in the matrix, or may be based upon the DC component of the quantization matrix. In general, the error limit should be selected so that the filter output is more like a previous output for pixels, blocks, or frames where little or no motion is present, and the filter output is more like the current input for pixels, blocks, or frames where significant motion is present. As will be appreciated, other approaches may be used to obtain a variable error limit for the filter, such as analysis of actual or estimated motion vectors for the multi-threaded video.

In step 408, a value for $\alpha$ may be selected for use by a filter such as the filter 314 shown in FIG. 3 and described by Eq. 3. When a value for $\alpha$ has been selected, a block of pixels may be filtered using the selected value, as shown in step 410. An error function may be calculated for the filter output, as shown in step 412. The error function may, for example, compare each pixel of filter output to a corresponding pixel of the frame for the reconstructed stream. In other words, with reference to FIG. 3, the error function is evaluated by comparing pixels of a possible output frame 304 to the frame 302 of the reconstructed stream. Pixel-by-pixel errors are summed to obtain an error value. As shown in step 414, this error value is compared to the error limit determined in step 406. If the error value is larger than the error limit, then the process 400 returns to step 408 where a new, smaller $\alpha$ is selected. For example, where $\alpha$ is defined in ⅛ increments from one to zero, $\alpha$ may be decremented by ⅛ (i.e., more like the new block of data). If the error value is smaller than the error limit, then the process 400 may proceed to step 416 and the block of filtered pixels may be used for an image. As shown in step 418, if the frame is not complete, then the process 400 may proceed to step 420 where a next block of pixels in the frame is selected. If the frame is complete, then the process 400 for the frame may terminate, as shown in step 422. Further frames may, of course, be processed in the above manner.

As will be apparent from the foregoing, $\alpha$ may be iteratively refined for a block of pixels. An initial value for $\alpha$ may be determined by examining an estimated motion vector, which may provide quantitave information describing changes to pixels of a block. Where a discrete set of $\alpha$ values are provided, such as the ⅛ increments noted above, the error function may be calculated for all values of $\alpha$ in parallel, and a suitable $\alpha$ selected by examining the resulting error values. In another embodiment, $\alpha$ values may be defined continuously from zero to one. In this case, a value for $\alpha$ that satisfies the error limit may be located using any suitable iterative process.

The foregoing process may be realized in software, or in hardware, or in some combination of hardware and software. The process 400 may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The process 400 may also, or instead, include an application specific integrated circuit, a programmable gate array, programmable array logic, or any other device that may be configured to process electronic signals.

Any combination of the above circuits and components, whether packaged discretely, as a chip, as a chipset, or as a die, may be suitably adapted to use with the systems described herein. The process 400 may also be integrated into a dedicated video processing coder/decoder. It will further be appreciated that the above process 400 may be realized as computer executable code created using a structured programming language such as C, an object oriented programming language such as C++, or any other high-level or low-level programming language that may be compiled or interpreted to run on one of the above devices.

While the invention has been disclosed in connection with the preferred embodiments shown and described in detail, various modifications and improvements thereon will become readily apparent to those skilled in the art. Accordingly, the spirit and scope of the present invention is to be limited only by the following claims, which should be interpreted in the broadest sense allowable by law.

What is claimed is:

1. A method for decoding video data comprising:
   receiving a video signal, the video signal including two or more threads, each thread including a plurality of frames of video data corresponding to a periodic interval of the video signal, and each thread including a motion vector for each one of the plurality of frames that relates current image data to previously received reference image data;
   calculating a motion vector for a virtual thread of video data based upon one or more motion vectors from one or more of the two or more threads;
   generating an estimated frame of the virtual thread by applying the motion vector for the virtual thread to a previous frame of the virtual thread; and
   providing the estimated frame of the virtual thread and an earlier frame of one of the two or more threads of the video signal to a filter, the filter providing as an output a new frame of the virtual thread.

2. The method of claim 1 further comprising displaying the virtual thread.

3. The method of claim 1 wherein the filter weights pixels from the earlier frame and the estimated frame according to a weight value to provide the new frame, the weight value selected so that an error function for the new frame is below a predetermined threshold.

4. The method of claim 3 wherein the error function is evaluated by summing, for one or more pixels of the virtual thread, a difference between a pixel value for the one of the one or more pixels of the virtual thread and a corresponding pixel value for one of the two or more threads.

5. The method of claim 3 wherein the predetermined threshold is proportional to at least one of a quantization value, a number of pixels in a block of the virtual thread, or a tuning parameter.

6. The method of claim 1 wherein the video signal relates to a video conference.

7. A method comprising:
   receiving a first block of pixels, the first block of pixels being from a multi-threaded video signal and corresponding to a region of an image;
   receiving a second block of pixels, the second block of pixels corresponding to estimated values for the region of the image; and
   applying the first block of pixels and the second block of pixels to a filter, the filter generating a third block of pixels according to a weight, the weight determining a contribution of a pixel of the first block of pixels and a pixel of the second block of pixels to a corresponding pixel of the third block of pixels; the weight selected so that an error function for the third block of pixels is below an error limit.

8. The method of claim 7 wherein the estimated values are determined by estimating motion vectors based upon one or more motion vectors decoded from the multi-threaded video signal, and applying the estimated motion vectors to a virtual thread output by the filter.

9. The method of claim 7 wherein the error function is evaluated by:
   selecting a value for the weight;
   applying the first block of pixels and the second block of pixels to the filter obtaining the third block of pixels;
   for each pixel of the region of the image, calculating a difference between a corresponding pixel from the third block of pixels and a corresponding pixel from the first block of pixels; and
   summing the differences.

10. The method of claim 7 wherein the error limit is evaluated by determining a product of a quantization value, a number of pixels, and a tuning parameter, the quantization value being decoded from a thread of the multi-threaded video, the number of pixels being the number of pixels in the region of the image, and the tuning parameter providing control over a sensitivity of the filter.

11. A computer program product for processing multi-threaded video data comprising:
   computer executable code for receiving a first block of pixels, the first block of pixels being from a multi-threaded video signal and corresponding to a region of an image;
   computer executable code for receiving a second block of pixels, the second block of pixels corresponding to estimated values for the region of the image; and
   computer executable code for filtering the first block of pixels and the second block of pixels by applying the first block of pixels and the second block of pixels to a filter, the filter generating a third block of pixels according to a weight, the weight determining a contribution of a pixel of the first block of pixels and a pixel of the second block of pixels to a corresponding pixel of the third block of pixels; and the weight selected so that an error function for the third block of pixels is below an error limit.

12. A video conferencing terminal configured to receive and process multi-threaded video data, the video conferencing terminal comprising:
   a decoder that decodes the multi-threaded video data into a plurality of threads of video;
   a processor programmed to:
      calculate a motion vector for a virtual thread of video data based upon one or more motion vectors from one or more of the plurality of threads of video; and
      generate an estimated frame of the virtual thread of video data by applying the motion vector for the virtual thread of video data to a previous frame of the virtual thread of video data; and
   a filter adapted to receive as inputs the estimated frame of the virtual thread of video data and an earlier frame of one of the plurality of threads of video and output a new frame of the virtual thread of video data.

13. The video conferencing terminal of claim 12 further comprising a display, the display outputting the virtual thread of video data.

14. The video conferencing terminal of claim 12 wherein the filter weights pixels from the earlier frame and the estimated frame according to a weight value to provide the new frame, the weight value selected so that an error function for the new frame is below a predetermined threshold.

15. The video conferencing terminal of claim 14 wherein the error function is evaluated by summing, for one or more pixels of the virtual thread of video data, a difference between a pixel value for the one of the one or more pixels of the virtual thread of video data and a corresponding pixel value for one of the plurality of threads of video.

16. The video conferencing terminal of claim 14 wherein the predetermined threshold is proportional to at least one of a guantization value, a number of pixels in a block of the virtual thread, or a tuning parameter.

* * * * *

UNITED STATES PATENT AND TRADEMARK OFFICE
CERTIFICATE OF CORRECTION

| | |
|---|---|
| PATENT NO. | : 7,206,016 B2 |
| APPLICATION NO. | : 09/846508 |
| DATED | : April 17, 2007 |
| INVENTOR(S) | : Qunshan Gu |

It is certified that error appears in the above-identified patent and that said Letters Patent is hereby corrected as shown below:

In Claim 16, Column 10, Row 52, please replace "guantization" with --quantization--

Signed and Sealed this

Twenty-ninth Day of May, 2007

JON W. DUDAS
*Director of the United States Patent and Trademark Office*